(12) United States Patent
Salmi et al.

(10) Patent No.: US 10,306,647 B2
(45) Date of Patent: May 28, 2019

(54) METHOD AND APPARATUS FOR SHIFTING CONTROL AREAS IN A WIRELESS COMMUNICATION SYSTEM

(71) Applicant: Huawei Technologies Co., Ltd., Shenzhen, Guangdong (CN)

(72) Inventors: Jussi Salmi, Kista (SE); Petteri Kela, Helsinki (FI); George Koudouridis, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 15/456,116

(22) Filed: Mar. 10, 2017

(65) Prior Publication Data

US 2017/0188351 A1 Jun. 29, 2017

Related U.S. Application Data

(63) Continuation of application No. PCT/EP2014/069490, filed on Sep. 12, 2014.

(51) Int. Cl.
*H04W 72/04* (2009.01)
*H04B 7/024* (2017.01)
(Continued)

(52) U.S. Cl.
CPC .......... *H04W 72/048* (2013.01); *H04B 7/024* (2013.01); *H04W 4/023* (2013.01); *H04W 24/08* (2013.01)

(58) Field of Classification Search
CPC ....... G06F 9/5094; H04W 4/02; H04W 24/08; H04W 72/04; H04W 72/048
See application file for complete search history.

(56) References Cited

U.S. PATENT DOCUMENTS 8,229,443 B2 7/2012 Caire et al.
2002/0031107 A1* 3/2002 Li ................. H04L 61/2015
370/338
(Continued)

FOREIGN PATENT DOCUMENTS

CN 106575983 A 4/2017
WO 2011150262 A1 12/2011

OTHER PUBLICATIONS

Baracca et al.; "A Dynamic Clustering Algorithm for Downlink CoMP Systems with Multiple Antenna UEs"; EURASIP Journal on Wireless Communications and Networking; 2014; 14 pages.
(Continued)

*Primary Examiner* — Andrew Lai
*Assistant Examiner* — Andrew C Lee

(57) ABSTRACT

An apparatus for assigning a plurality of access nodes of a wireless communication network to control areas includes a processing apparatus. The processing apparatus is configured to assign each access node in the plurality of access nodes to a control area of a plurality of control areas and to determine a first control phase. The first control phase is a period of time during which the assignment of access nodes to control areas remains constant. The processing apparatus is configured to, when changing from the first control phase to a following second control phase, reassign at least a subset of access nodes which were assigned during the first control phase to a first control area to a second control area and reassign at least a subset of access nodes which were assigned during the first control phase to a third control area to the first control area.

17 Claims, 14 Drawing Sheets

(51) Int. Cl.
*H04W 4/02* (2018.01)
*H04W 24/08* (2009.01)

(56) References Cited

U.S. PATENT DOCUMENTS

| | | | | |
|---|---|---|---|---|
| 2003/0016770 | A1* | 1/2003 | Trans | H04B 1/00 375/346 |
| 2007/0249386 | A1* | 10/2007 | Bennett | H04N 21/4126 455/550.1 |
| 2008/0144493 | A1* | 6/2008 | Yeh | H04W 52/50 370/230 |
| 2013/0242769 | A1* | 9/2013 | Hammarwall | H04L 5/0016 370/252 |
| 2014/0057618 | A1* | 2/2014 | Zirwas | H04B 7/024 455/418 |
| 2014/0359633 | A1* | 12/2014 | Breternitz | G06F 9/5094 718/104 |
| 2015/0103765 | A1* | 4/2015 | Wang | H04L 5/0048 370/329 |
| 2017/0188204 | A1* | 6/2017 | Kela | H04W 72/121 |
| 2017/0188351 | A1 | 6/2017 | Salmi et al. | |

OTHER PUBLICATIONS

Stancanelli et al.; "Application of Dynamic Clustering in CoMP Systems"; Brazillian Symposium on Telecommunications; Brasillia, Brazil; Sep. 13-16, 2012; 5 pages.
Patcharamaneepakorn et al.; "On the Equivalence Between SLNR and MMSE Precoding Schemes with Single-Antenna Receivers"; IEEE Communications Letters; vol. 16, No. 7; Jul. 2012; 4 pages.
Yoo et al.; "On the Optimality of Multiantenna Broadcast Scheduling Using Zero-Forcing Beamforming"; IEEE Journal on Selected Areas in Communications; vol. 24, No. 3; Mar. 2006; 14 pages.

* cited by examiner

METHOD AND APPARATUS FOR SHIFTING CONTROL AREAS IN A WIRELESS COMMUNICATION SYSTEM

CROSS-REFERENCE TO RELATED APPLICATIONS

This application is a continuation of International Application No. PCT/EP2014/069490, filed on Sep. 12, 2014. The disclosures of the aforementioned applications are hereby incorporated by reference in their entireties.

TECHNICAL FIELD

The aspects of the present disclosure relate generally to wireless communication systems and in particular to coordination of transmissions in a wireless network.

BACKGROUND

The proliferation of modern wireless communications devices, such as cell phones, smart phones, and tablet devices, has seen an attendant rise in demand for large multimedia data capabilities such as streaming video, TV, music, and internet access at the mobile device or user node, also referred to as the user equipment (UE). To support this ever increasing demand for higher data rates new communications techniques are being developed to take advantage of new capabilities incorporated in modern mobile devices and access nodes. These new capabilities include improvements such as placing multiple transmit and receive antennas at the access nodes and user equipment to increase spatial diversity through the use of multiple input multiple output (MIMO) techniques.

A user obtains wireless service by establishing a connection or radio link between their mobile device and an access node in the communication network. The connection or radio link may be considered established when the signals between the mobile device and the access node are of sufficient quality to transmit data with an acceptable or predetermined quality of service (QoS). For example one metric used to evaluate QoS is the block error rate (BLER). A network may set a fixed floor value, such as 10%, or may use a formula to adaptively adjust the acceptable BLER based on current network conditions. For purposes herein an access node is a collection of one or more antennas configured to provide service to a contiguous geographic area, and transmission and reception of the collection of antennas is controlled by a single physical layer mechanism. The antennas and physical layer mechanism may be collocated at a single location or base station or they may be distributed at a number of locations in order to provide adequate service throughout the desired coverage area. The physical layer may include a single processing device or it may include a number of processing devices distributed at various locations with all the processing devices communicatively coupled by a communication network to allow them to jointly coordinate transmission and reception of the collection of antennas. The area covered by an access node, where transmission conditions are good enough to maintain a connection between the mobile device and the access node, is referred to as the coverage area of the access node and may also be referred to as a cell.

In a typical wireless communication network a plurality of access nodes is distributed over a geographical area where the access nodes are positioned to provide mobile users, generally referred to herein as user nodes, with wireless communication services. This geographical area encompassing the combined coverage area of all the access nodes is referred to as the service area.

When an access node is servicing more than one user node, meaning the access node has multiple mobile devices or user nodes connected to it, the user nodes need to be able to separate information being sent to them from information being sent to other user nodes within the same cell. This can be done by separating the signals in time by sending information to each user node during a different time slot. Signals can also be separated using frequency, where information is sent to all the user nodes at the same time using a different frequency band for each user node. Diversity necessary to separate signals can also be obtained by spatial separation where signals are sent from antennas that a distance apart. Spatial separation of the antennas results in each user node experiencing a different complex gain from each antenna. This allows each user node to separate their signals using spatial filtering or other signal processing techniques. A group of user nodes that are all spatially enough separated to allow separation of their respective signals is referred to as a spatial multi-user group.

In a conventional cellular network, each access node services user nodes within its coverage area or cell. As a user node moves between cells, the user node is handed off from one access node to another access node. A user node may be assigned to a cell based on its geographical location or alternatively the assignment may be done based on signal strength. With this conventional approach, a user node at the edges of a cell may suffer from weak signals and inter-cell interference (ICI) resulting in a lower level of service. It is often the case that a user node in the cell edge region may be able to establish a viable radio connection with multiple access nodes servicing adjacent cells.

If signals between a user node in this cell edge region and multiple cell sites are coordinated, both the downlink (transmissions from the network to the user node) and uplink (transmissions from a user node to the network) can be significantly improved. This type of coordination of multiple access nodes is referred to as coordinated multipoint (CoMP) transmission/reception. CoMP can be as simple as interference avoidance or in more complex systems, multiple access nodes can transmit the same data to a single user node thereby improving transmission quality through spatial diversity.

For downlink transmission, two types of CoMP may be used; coordinated scheduling also referred to as Coordinated Beamforming (CBF); and Joint Processing/Joint Transmission (JP/JT). With coordinated scheduling or CBF, the transmission to a single user node is transmitted from the servicing access node, exactly as in the case of non-CoMP transmission. However, the scheduling, including any beamforming functionality, is dynamically coordinated between the access nodes in order to control and/or reduce the interference between different transmissions. For JP/JT, the data sent to a single user node is simultaneously transmitted from multiple antennas controlled by multiple access nodes servicing different cell areas. These multi-point transmissions are coordinated as if they were being sent by a single transmitter with geographically distributed antennas.

Groups of coordinated access nodes are referred to as CoMP sets or CoMP clusters and provide a potential for much higher performance than coordinated scheduling alone. However, this higher performance comes at the cost of increased backhaul requirements. Backhaul is a term used for communication between access nodes via a mechanism different than the radio link used by the user node.

Forming groups of CoMP clusters in large wireless network environments presents a number of problems. Computational resources available for scheduling in any given area being controlled are limited, so the size of the area controlled, or the control area, will also be limited. When the control area is small, such as a single cluster of access nodes, extensive interference can be introduced from adjacent control areas. There is also a problem of how to handle the edges of control areas, since users that remain near a control area edge for a prolonged time may experience reduced service.

Thus, there is a need for improved apparatus and methods for forming and managing control areas in order to provide improved communication services while keeping resource requirements low.

SUMMARY

It is an object of the present invention to provide methods and apparatus to improve performance of wireless communications.

This is achieved by assigning access nodes to control areas for a period of time and reassign access nodes to control areas during subsequent periods of time. The methods and apparatus disclosed herein are useful in wireless communication systems having a large number of users or mobile devices, and an array of access nodes distributed throughout a service area. The control areas facilitate formation of clusters of access nodes appropriate for CoMP scheduling and avoid having access nodes remaining at control area boundaries where they would suffer from reduced performance due to edge affects.

The foregoing and other objects are achieved by the features of the independent claims. Further implementation forms are apparent from the dependent claims, the description and the figures.

According to a first aspect of the present invention the above and further objects and advantages are obtained by an apparatus for assigning a plurality of access nodes of a wireless communication network to control areas. The apparatus includes a processing apparatus configured to assign each access node in the plurality of access nodes to a control area of a plurality of control areas and to determine a first control phase. The first control phase is a period of time during which the assignment of access nodes to control areas remains constant. The processing apparatus is configured to when changing from the first control phase to a following second control phase, reassign at least a subset of access nodes which were assigned during the first control phase to a first control area to a second control area of the plurality of control areas and reassign at least a subset of access nodes which were assigned during the first control phase to a third control area of the plurality of control areas to the first control area.

In a first possible implementation form of the apparatus according to the first aspect the processing apparatus is configured to reassign the control areas such that an access node that is adjacent an edge of the first control area during the first control phase is not adjacent an edge of the first control area during the following second control phase.

In a second possible implementation for of the apparatus according to the first aspect as such or to the first implementation form of the first aspect the processing apparatus is further configured to determine a set of lagging access nodes in the plurality of access nodes based on a service metric; and assign and reassign the access nodes to the plurality of control areas based on the determined set of lagging access nodes.

In a third possible implementation form of the apparatus according to the first aspect as such or to the second possible implementation form of the first aspect the service metric comprises: a ratio of aggregate service requested from an access node to aggregate service provided by the access node; a difference between aggregate service requested from an access node to aggregate service provided by the access node; or a set of predefined threshold values indicating a service surplus or service deficit associated with an access node.

In a fourth possible implementation form of the apparatus according to the first aspect as such or to any of the preceding first through third implementation forms of the first aspect the processing apparatus is configured to determine a size of each of the plurality of control areas based on a distance threshold between centers of two adjacent control areas. The processing apparatus is further configured to determine a set of lagging access nodes in the plurality of access nodes and for each lagging access node in the set of lagging access nodes: assign the lagging access node to a first control area in a respective candidate set of control areas such that a distance between a center of the first control area and the first lagging access node is minimized; assign each of the remaining lagging access nodes to a remaining control area in the respective candidate set of control areas; compute an aggregate sum distance by summing a distance between each lagging access node in the set of lagging access nodes and a center of the control area in the respective candidate set of control areas to which the lagging access nodes is assigned. The processing apparatus is further configured to choose the candidate set of control areas for assigning the access nodes to, which exhibits the lowest aggregate sum distance.

In a fifth possible implementation form of the apparatus according to the first aspect as such or to any of the preceding first through fourth implementation forms of the first aspect the processing apparatus is further configured to determine a number of control areas of the plurality of control areas based on an expected network load in the control areas and to assign the access nodes to the plurality of control areas in dependence on the determined number of control areas to be formed.

In a sixth possible implementation form of the apparatus according to the fifth possible implementation form of the first aspect the processing apparatus is further configured to vary the number of control areas between different control phases, in dependence on an expected network load during the different control phases.

In a seventh possible implementation form of the apparatus according to the first aspect as such or to any of the preceding first through sixth possible implementation forms of the first aspect the apparatus further comprises an interface coupled to the processing apparatus and configured to communicate with a plurality of control elements, and wherein the processing apparatus is further configured to communicate information about the assignment of the access nodes to the control areas to at least one control element in the plurality of control elements.

In an eighth possible implementation form of the aspect according to the first aspect as such or to any of the preceding first through seventh possible implementation forms form of the first aspect the processing apparatus is configured to instruct access nodes assigned to a same control area to perform coordinated multi-point transmission or reception or multi-input multi-output type transmissions.

In a ninth possible implementation form of the apparatus according to the first aspect as such or to any of the preceding first through eighth possible implementation forms of the first aspect the processing apparatus is configured to assign the access nodes to the control areas, such that each access node is assigned to only one control area per control phase.

In a tenth possible implementation form of the apparatus according to the first aspect as such or to any of the preceding first through ninth possible implementation forms of the first aspect the processing apparatus is configured to assign for each control area a dedicated control element configured to control the access nodes assigned to the respective control area.

In an eleventh possible implementation form of the apparatus according to the first aspect as such or to any of the preceding first through tenth possible implementation forms of the first aspect the processing apparatus is configured to change from the first control phase to the following second control phase in response to a change of an expected network load at the plurality of access nodes.

In a twelfth possible implementation form of the apparatus according to the first aspect as such or to any of the preceding first through eleventh possible implementation forms of the first aspect the processing apparatus is configured to determine a set of lagging access nodes in the plurality of access nodes. The processing apparatus is configured to determine the number of control areas of the plurality of control areas based on the number of lagging access nodes in the set of lagging nodes. The processing apparatus is configured to assign the access nodes to the control areas, by firstly assigning each lagging access node to a separate control area, such that a distance between the lagging access node and the control area to which the lagging access node is assigned is minimized and by subsequently assigning the remaining access nodes in the plurality of access nodes to the control areas based on a location of the access nodes and based on an expected load of the access nodes, until all access nodes are assigned to a control area.

In a thirteenth possible implementation form of the apparatus according to the first aspect as such or to any of the preceding first through twelfth possible implementation forms of the first aspect the candidate set of control areas comprises a regular pattern of rectangular shaped control areas or a regular pattern of hexagonally shaped control areas.

In a first possible implementation form of the apparatus according to the fourth possible implementation form of the apparatus according to the first aspect the processing apparatus is configured to compute an aggregate sum distance based on a distance, a proximity, or a signal strength between each lagging access node in the set of lagging access nodes and a center of the control area in the respective candidate set of control areas to which the lagging access nodes is assigned.

According to a second aspect of the present invention the above and further objects and advantages are obtained by a method for assigning a plurality of access nodes of a wireless communication network to control areas. The method includes assigning each access node in the plurality of access nodes to a control area of a plurality of control areas; determining a first control phase, wherein the first control phase comprises a period of time during which the assignment of access nodes to control areas remains constant; and when changing from the first control phase to a following second control phase, reassigning at least a subset of access nodes which were assigned during the first control phase to a first control area to a second control area of the plurality of control areas and reassigning at least a subset of access nodes which were assigned during the first control phase to a third control area of the plurality of control areas to the first control area.

According to a third aspect of the present invention the above and further objects and advantages are obtained by a computer program comprising a program code for performing the method according to the second aspect when the computer program runs on a computer.

These and other aspects, implementation forms, and advantages of the example embodiments will become apparent from the embodiments described below considered in conjunction with the accompanying drawings. It is to be understood, however, that the description and drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION

Figure 1:
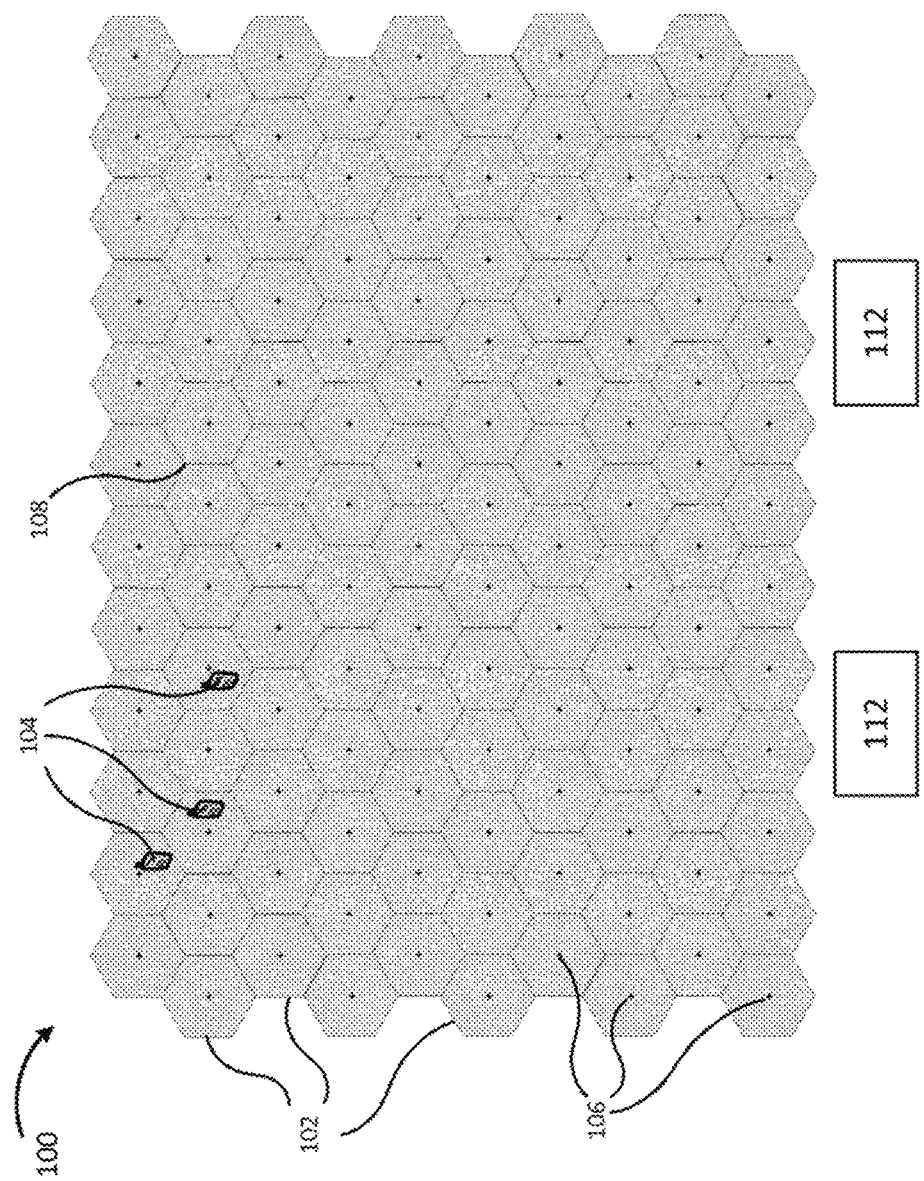
FIG. 1 illustrates a communication network appropriate for practicing embodiments of the present invention.

Referring now to FIG. 1 there can be seen an illustration of a service area 100 of a communication network appropriate for practicing embodiments of the present disclosure. For the purposes of the disclosure herein, the communication network will generally be referred to as a wireless communication network.

The service area 100 is depicted in FIG. 1 using a conventional honeycomb configuration of hexagonally shaped cells 102. Each individual cell, such as cell 102, represents the coverage area of one access node 106, generally represented as a cross at the approximate center of each cell 102. Alternatively the antennas of three access nodes may be placed at the intersection of three cells 108 in order to reduce the number of towers and other physical equipment needed. The antennas and physical layer of each access node 106 may be placed anywhere within or outside the cell 102 as necessary to provide the desired signal quality throughout a cell 102.

A plurality of regularly spaced cells 102 distributed throughout an area forms the service area 100. It should be noted that depiction of cells 102 or coverage areas in the figures as regularly spaced hexagons of uniform size and shape is presented here merely as an aid to understanding. Those skilled in the art will readily recognize that the disclosed embodiments may be advantageously employed in other wireless communication networks where the coverage area of each access node 106 may be irregularly shaped, may have different sizes, and may not be uniformly distributed across the service area, and where the antennas and other components of each access node 106 may be distributed at various locations throughout or outside the coverage area of the access node 106.

The service area 100 includes various network nodes or entities including the access nodes 106, and user nodes 104. The access nodes 106 may be centrally located as illustrated in FIG. 1. Alternatively, the access nodes 106 can be distributed throughout or outside the associated cell 102 as described above. The access nodes 106 of a service area 100 are communicatively coupled via a backhaul or other communication network (not shown) allowing them to share data and other information.

User nodes 104, also referred to as user equipment (UE) or mobile stations, are distributed throughout the service area 100. The user nodes 104 may include, but are not limited to, equipment and devices such as cell phones, tablets, or other suitable user equipment. The user nodes 104 are typically separate physical entities. The access nodes 106 may be a single physical entity or may be distributed among a number of tightly coupled physical entities. FIG. 1 depicts only three user nodes 104, however it should be understood that more or less user nodes are typically distributed throughout many or all of the cells 102 in the service area 100 at any given point in time.

Control Area Shifting

Figure 2A:
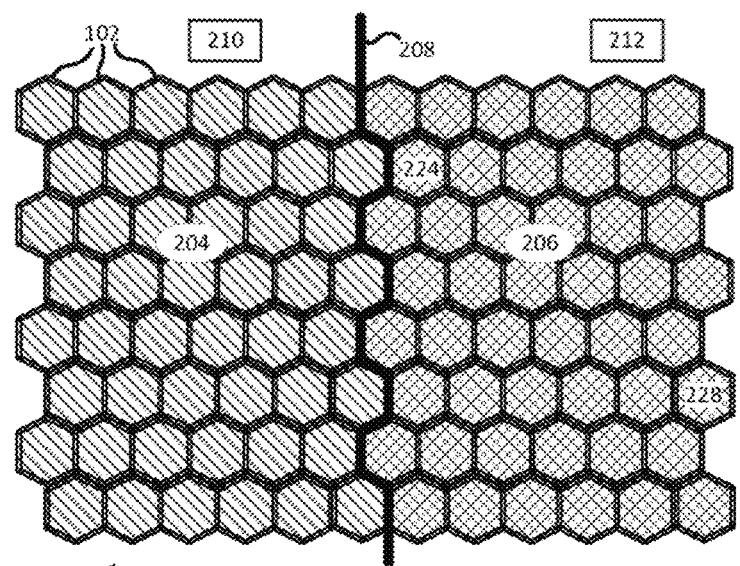
FIG. 2a and FIG. 2b are a illustrates an example pattern for shifting control areas between control phases in a wireless network incorporating aspects of the disclosed embodiments.
Figure 2B:
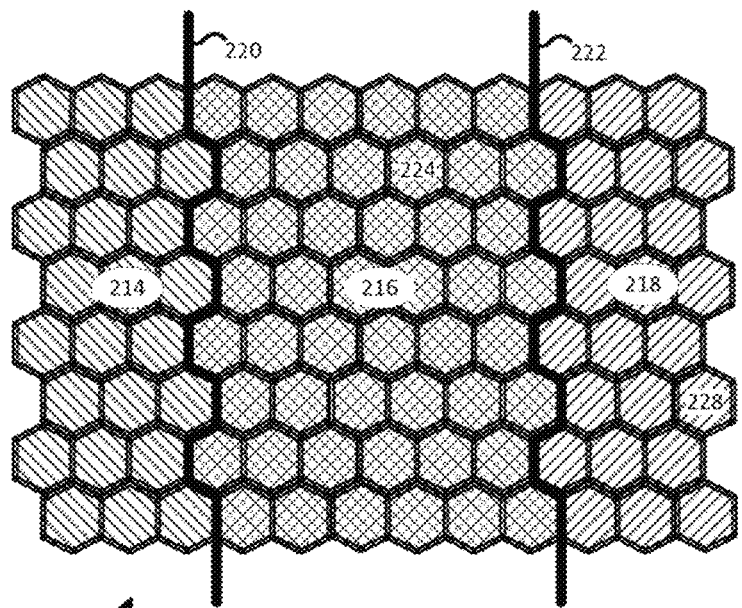

FIGS. 2a and 2b illustrate an embodiment of partitioning of a service area 202 into control areas 204, 206 during two successive control phases. In the illustrations of FIGS. 2a and 2b, individual cells 102 are depicted as regularly shaped hexagons as described above, and all cells 102 assigned to a particular control area, such as control area 204, are shaded in a similar fashion. For example all cells 102 associated with control area 204 are shaded with diagonal lines.

The access nodes associated with each cell 102 are not depicted in the network diagram illustrated in FIGS. 2a, 2b. The access node associated with each cell 102 includes one or more antennas and a physical layer. The access node may be located near the center of the cell 102, at the intersection of three cells as described above or distributed within or outside the cell 102 as necessary to provide the desired signal strength throughout each cell 102.

Also included in service area 202 are control elements 210, 212. The control elements 210, 212 are processing apparatus communicatively coupled with the access nodes of each cell 102 via a backhaul or other type of communication network configured to provide coordination and control of the cells 102 in the service area 202. Control elements 210, 212 may be implemented centrally on a server or other processing apparatus configured for the purpose, or the control elements 210, 212 may be implemented as distributed computer processes running on one or more processing apparatus available in the communication network.

For scheduling of network communications, the time dimension is divided into a series of control phases, where each control phase may contain one or more transmission time slots. The control phases can all be of the same length or they may have different time durations as desired. The length of each control phase is based on the number of user nodes in the service area 202 and the amount of service required by the user nodes. In a network that is experiencing a high level of traffic or highly mobile user nodes, a shorter control phase can be appropriate.

During each control phase, the cells 102, or more particularly the access nodes servicing each cell 102, are partitioned into a number of control areas 204, 206 where transmission from the access nodes within one control 204, 206 area are controlled or scheduled by a single control element 210, 212. Note that the access nodes are not illustrated in FIGS. 2a, 2b, however those skilled in the art will recognize that each cell 102 includes a corresponding access node to service each cell 102. Similarly, user nodes are not illustrated in FIGS. 2a, 2b and it should be understood that one or more user nodes are distributed throughout the service area 202 during each control phase.

The control elements 210, 212 allocate the access nodes associated with each cell 102 within their respective control area 204, 206 to a number of clusters and coordinate the access nodes in each cluster to perform CoMP transmission or reception for the user nodes being serviced by the cluster of access nodes. Clusters implementing CoMP transmission/reception are referred to as a CoMP clusters or just clusters, and are formed based on the requirements of the user nodes requiring service within the control area 204, 206. Each CoMP cluster may contain one or more access nodes and may serve single or multiple user nodes through CoMP transmission (or reception).

During a first control phase, illustrated in FIG. 2a, the service area 202 is partitioned into two control areas 204, 206 along a control area boundary 208. Transmission of cells 102 within the first control area 204 are coordinated during the first control phase by a first control element 210 that is communicatively coupled to each cell 102 in the control area 204 through a backhaul network (not shown). Similarly a second control element 212 coordinates cells 102 in the second control area 206 during the first control phase.

During the next or following control phase the control areas 206 are shifted as illustrated in FIG. 2b, to form a second set of control areas 214, 216, 218 such that a cell 224 lying adjacent the control area boundary 208 during the first control phase as illustrated in FIG. 2a, is not adjacent a control area boundary 220, 222 during the next control phase, as illustrated in FIG. 2b. It is to be pointed out that the cells 102 have physical locations and do not move as control areas 204, 206 are shifted. Therefore, a cell 228 that is at the edge of the service area 202, as shown in FIG. 2a for example, will remain at the edge of the service area 202 even though the control area boundaries 208, 220, 222 shown in FIG. 2b have moved. Although the aspects of the disclosed embodiments are described herein with respect to partitioning a service area into two control areas, alternatively, a service area 202 may be partitioned into more than two control areas during each control phase (e.g. depending on service requirements in the service area 202).

Figure 3A:
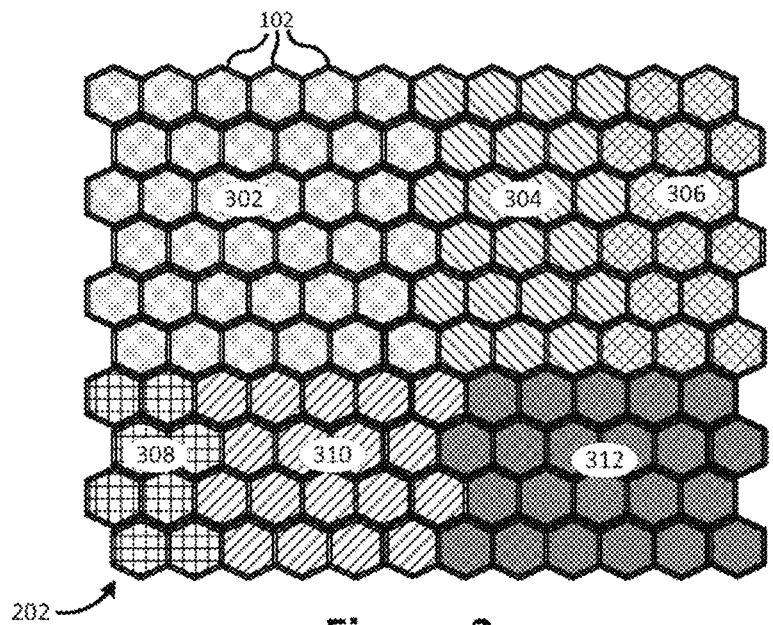
FIG. 3a and FIG. 3b are a illustrates an example pattern for shifting control areas employing six control areas during each control phase incorporating aspects of the disclosed embodiments.
Figure 3B:
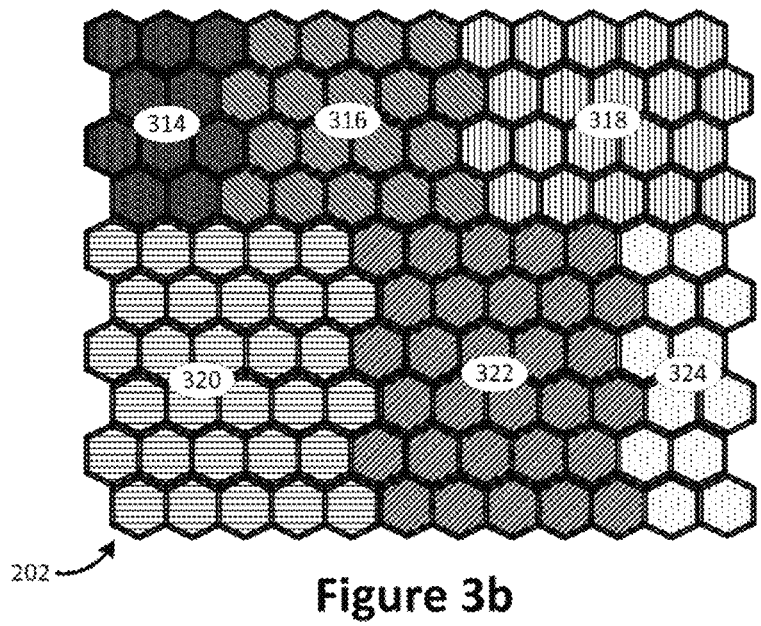

Referring to FIGS. 3a and 3b, an exemplary partitioning of the service area 202 into six control areas during a first control phase (FIG. 3a) and a second control phase (FIG. 3b) is illustrated. As before, FIG. 3a depicts individual cells 102 as regularly shaped hexagons, and all cells 102 assigned to a particular control area, such as control area 302, are shaded in a similar fashion.

In the example of FIG. 3a, the service area 202 is partitioned into a first set of six control areas 302, 304, 306, 308, 310, 312, during the first control phase. During the following control phase, referring to FIG. 3b, the service area 202 is partitioned into a different set of six control areas 314, 316, 318, 320, 322, 324. Alternating between the first set of control areas 302, 304, 306, 308, 310, 312 and the second set of control areas 314, 316, 318, 320, 322, 324 in each successive control phase avoids having any cell 102 remaining at the border of a control area at all times.

Figure 4A:
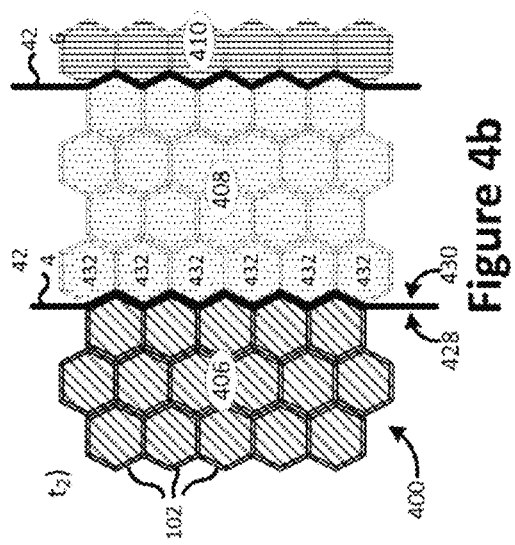
FIG. 4a and FIG. 4b and FIG. 4c and FIG. 4d are a illustrates a round-robin scheduling technique incorporating aspects of the disclosed embodiments.

FIGS. 2a, 2b, 3a and 3b illustrate embodiments where control areas are formed for each control phase by alternating between two predefined sets of control areas. Alternatively more than two sets of control areas can be advantageously employed and the sets of control areas for use during a control phase may be selected using round-robin scheduling or other appropriate scheduling technique. FIGS. 4a-4d illustrates an example of round-robin type partitioning of a service area 400 using four sets of control areas. As before, cells 102 are depicted in FIG. 4a-4d as hexagons. Control areas, such as control areas 402, 404 in FIG. 4a, are indicated by shading all cells 102 assigned to the same control area in a similar fashion, and the combined coverage area of all the cells 102 is referred to as the service area 400.

Figure 4B:
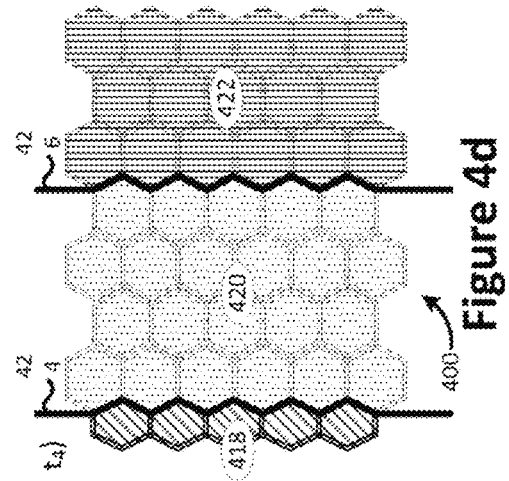
Figure 4C:
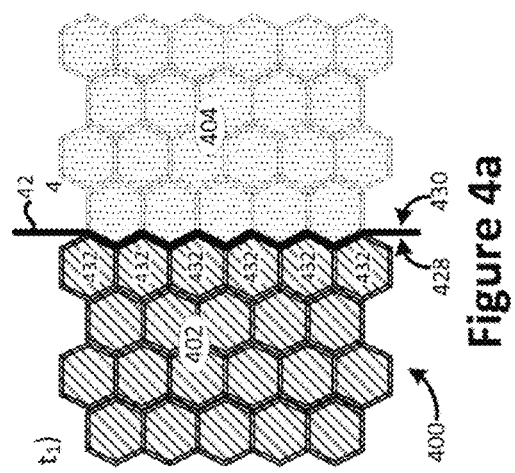
Figure 4D:
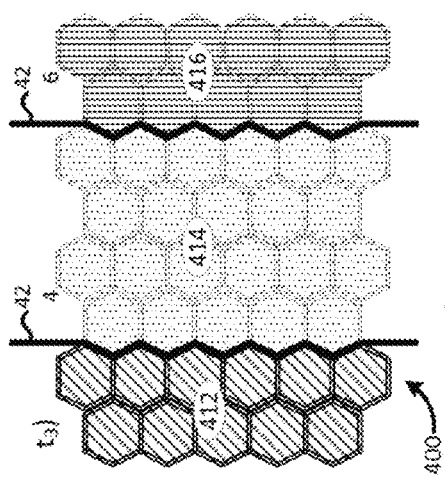

Referring to FIG. 4a, during the first control phase $t_1$, the service area 400 is partitioned into a set of two control areas 402, 404 having substantially equal size. As shown in FIG. 4b, during the next control phase $t_2$, the service area 400 is partitioned into a second set of control areas 406, 408, 410. Continuing on to FIG. 4c, the service area 400 is partitioned into a third set of control areas 412, 414, 416 during a third control phase $t_3$, and in FIG. 4d, a fourth set of control areas 418, 420, 422 during a fourth control phase $t_4$. This pattern then repeats during each following set of four successive control phases.

Repeating a set of control areas in the illustrated round-robin fashion has the effect of essentially walking the control area boundaries 424, 426 across the service area 400 such that no cell 102 is adjacent a control area boundary 424, 426 during all control phases. For larger service areas with a greater number of cells it may be advantageous to partition the service area 400 into more than two control areas and use a correspondingly larger number of control areas in subsequent control phases. The sets of control areas may be pre-defined or alternatively they may be determined prior to each control phase based on a predefined algorithm.

For example, control areas 406, 408, 410 for the second control phase $t_2$ may be obtained from the control areas 402, 404 in the first control phase $t_1$ by assigning the cells or access nodes 432 that are adjacent a first side 428 of the control area boundary 424 during the first control phase $t_1$ to a control area 408 adjacent a second side 430 of the control area boundary 242 during the second or next control phase $t_2$. This prevents any cell from being adjacent to a control area boundary at all times.

The control area boundaries 424, 426 need not be simple vertical slices of the control areas 406, 408, 410 as illustrated in FIG. 4b. Alternatively, the control area boundaries 424, 426 may define more complex shaped control areas, such as for example rectangular or hexagonal shapes, and the above described algorithm may be used to walk these shapes across the respective service area.

In certain embodiments it is advantageous to employ an adaptive approach to control area formation that takes loading of access nodes within a communication network into account, thereby adapting control areas to more effectively address the current state of the network. For example, control area formation may be based on the service demanded or received by user nodes being serviced by access nodes of the network. Adaptive control area formation may be accomplished in two steps:

1) determining the number and/or size of control areas to be formed; then
2) identifying and locating the control areas within the service area.

Determination of the number and/or size of control areas may be based on status of access nodes in the service area where the status of the access nodes is determined using a suitable service metric to provide a quantitative measure of the service provided by each access node. Access nodes that are not performing as well as other access nodes in the network are designated as lagging in service and may be referred to as lagging access nodes. Determination of a lagging access node may be accomplished using a service metric.

For example one suitable service metric for determining lagging access nodes would be a metric that provides some measure of the service received by user nodes connected to the access node or a metric relating requested service to received service. When computing the service metric, it is often advantageous to aggregate the service over one or more control phases in order to take longer term network variations into account. The service metric indicates the service deficit or surplus of an access node and provides a value that can be used to determine which access nodes are lagging in service as compared to other access nodes in the network at any point in time.

Another example of a suitable service metric would be a ratio of the aggregate service received from an access node by all the user nodes connected to that access node divided by the aggregate service requested from the access node by the same user node. Alternatively, the service metric may be based on the difference between the aggregate or average requested service and the aggregate or average received service over one or more control phases. Any service metric that quantifies performance of an access node relative to other access nodes may be advantageously employed to determine which access nodes are lagging. Depending on how a metric is formulated, some service metrics yield a lower value to indicate poor or less advantageous performance and others will yield a higher value to indicate poor performance. In either case a suitable service metric allows the access nodes to be sorted according to their service metric value and the most lagging access nodes can then be identified from the sorted list.

The process of computing a service metric for each access node and sorting the access nodes according to their service metric value provides a set of lagging access nodes at a particular point in time. The set of lagging access nodes may then be used as the basis for control area formation. Selection of the set of lagging access nodes may be based on a predetermined threshold for the metric value, where all access nodes whose associated level of service is below the predetermined threshold are selected, or the set of lagging access nodes may include a predetermined number of the most lagging access nodes as indicated by their metric values. Alternatively, some combination of both a threshold value and a predetermined number may be advantageously employed.

In situations where a single threshold value fails to yield a desirable size for the set of lagging access nodes, such as a set of lagging access nodes that is too small or too large, a plurality of threshold values may be used. In this case when a first threshold value yields an undesirable number of access nodes, i.e. too few or too many access nodes, the next threshold value is used and so forth until a desired number of lagging access nodes is obtained.

Figure 5:
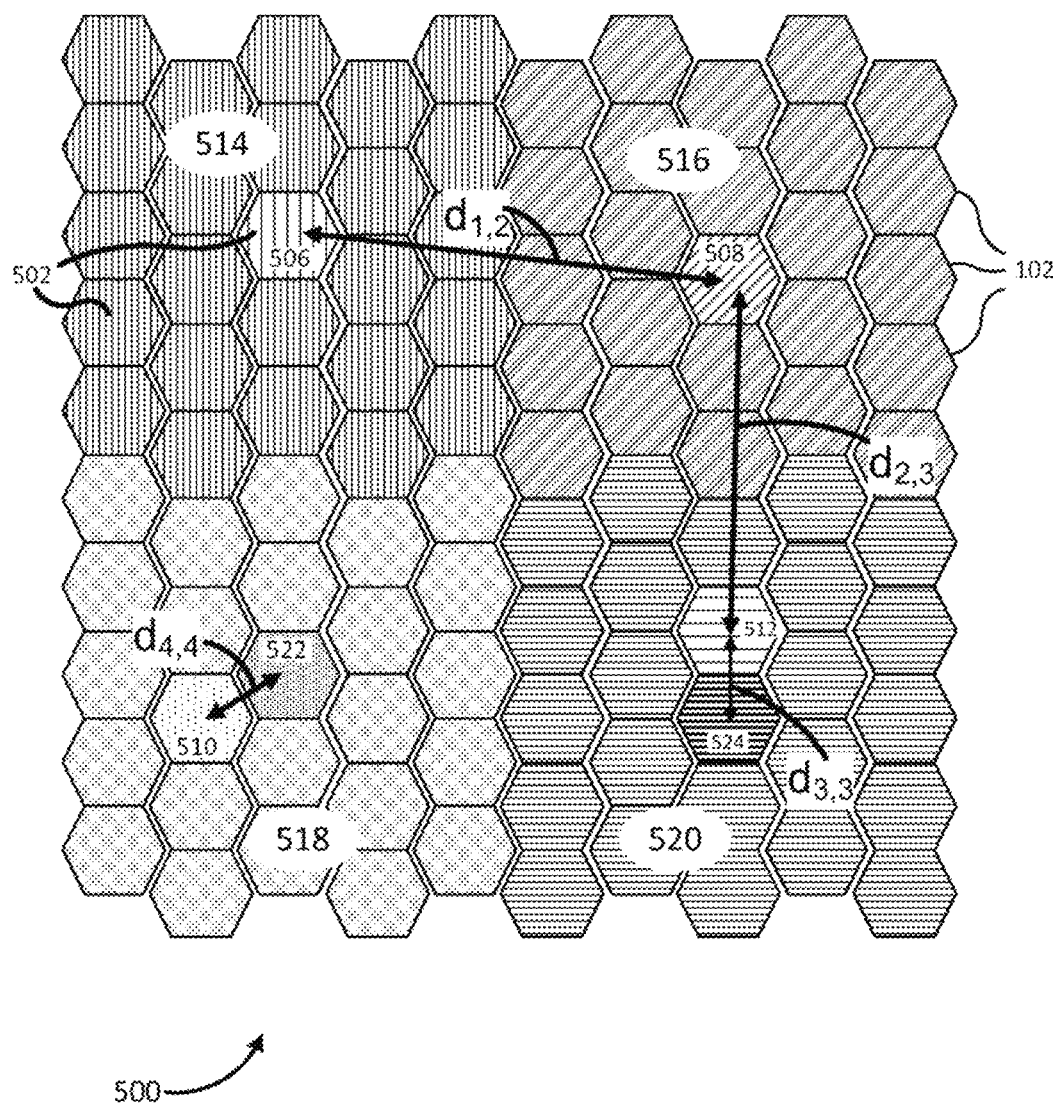
FIG. 5 illustrates an algorithm for adaptively forming control areas incorporating aspects of the disclosed embodiments.

Referring now to FIG. 5 there can be seen an illustration of an application of adaptive control area formation incorporating aspects of the present disclosure. As before, cells 102 are depicted in FIG. 5 as hexagons, control areas, such as control areas 514, 516, 518 and 520, are indicated by shading all cells 102 assigned to the same control area in a similar fashion. For example, all cells 102 in control area 516 are shaded with diagonal lines. The combined coverage area of all the cells 102 is referred to as the service area 500.

As a first step, a set of lagging access nodes 506, 508, 510, 512 is identified as described above. Once the set of lagging access nodes 506, 508, 510, 512 is determined, an appropriate number of control areas can be determined by finding the minimum distance $d_{1,2}$ between two adjacent lagging access nodes 506, 508 among the set of lagging access nodes 506, 508, 510, 512. This minimum distance $d_{1,2}$ is used as the basis of control area formation. Alternatively, it may be advantageous to base control area formation on an average distance between lagging access nodes, a maximum distance between lagging access nodes, or on a minimum inter-control area distance set by the network operator. The mapping of control areas to the actual access nodes will strive towards having a mapping where the lagging access nodes lie as close as possible to the center of the control areas.

For example the distances $d_{1,2}$ and $d_{2,3}$ and the set of lagging access nodes 506, 508, 510, 512 yields a number of possible mappings of access nodes to control areas. The most appropriate mapping is the one that minimizes the distance between the lagging access nodes and the associated control area center. In the example of FIG. 5, the control areas 514, 516, 518, 520 are formed to create a regular pattern of substantially equal sized rectangles with the size and location of each control area 514, 516, 518, 520 being determined based on the distances $d_{1,2}$ and $d_{2,3}$ and the set of most lagging access nodes 506, 508, 510, 512. With this control area placement the approximate centers of the control areas 514 and 516 are coincident with two of the most lagging access nodes 506 and 508. Thus, the distance between the most lagging access nodes 506 and 508 and their associated control area centers is zero.

In the other two control areas 518, 520 the control area centers 522, 524 are not coincident with the most lagging access nodes 510, 512 resulting in distances $d_{3,3}$ and $d_{4,4}$ between the control area centers 522, 524 and the lagging access nodes 510, 512 respectively. Thus, the aggregate distance for this control area placement is the sum of distances $d_{3,3}$ and $d_{4,4}$. Alternatively, control area formation may be accomplished by using the set of lagging nodes and the distance between lagging access nodes to locate the control area centers within the service area, then assign the remaining access nodes to control areas based on their distance or proximity to each control area center.

In the embodiments described herein, the distance between access nodes is generally based on the physical distance, such as the distance between the centers of the coverage areas of the access nodes. Alternatively, the distance or proximity between lagging access nodes may be based on path loss, signal strength, or other radio parameters of interest. Use of radio parameters to determine distance or proximity between access nodes may be achieved by reporting of the received signal status from interfered user nodes within the service area or based on an in-band communication between the access nodes.

Figure 6:
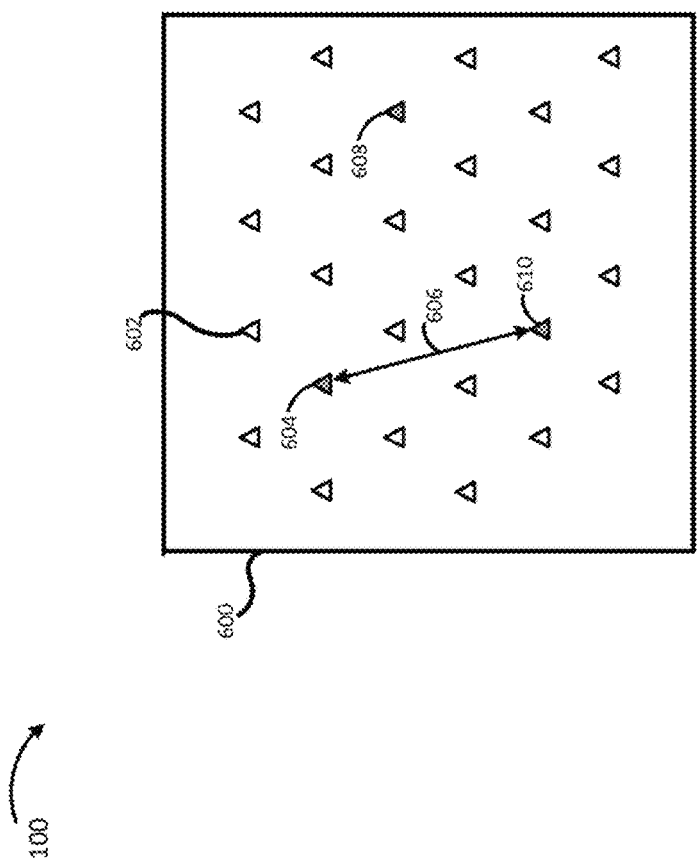
FIG. 6 illustrates a service area with lagging access nodes incorporating aspects of the present disclosure.
Figure 7:
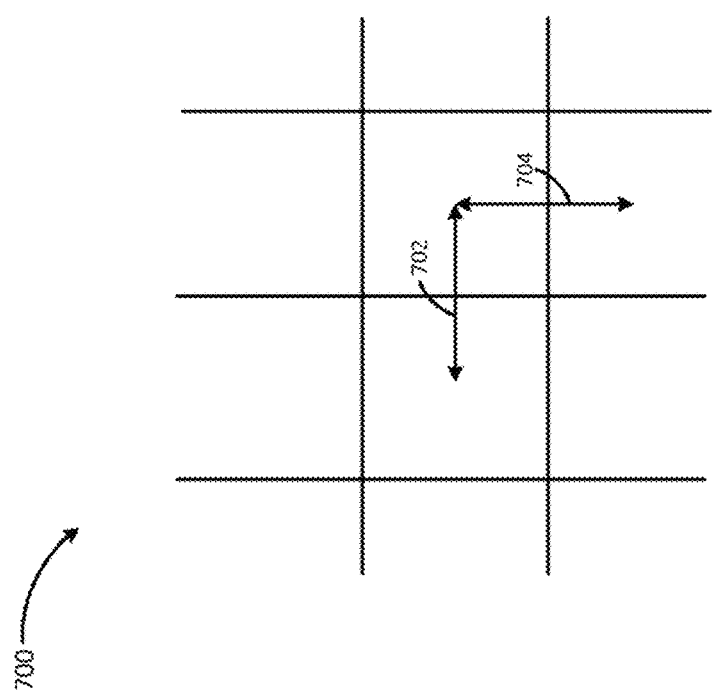
FIG. 7 illustrates an example control area pattern incorporating aspects of the disclosed embodiments.
Figure 8:
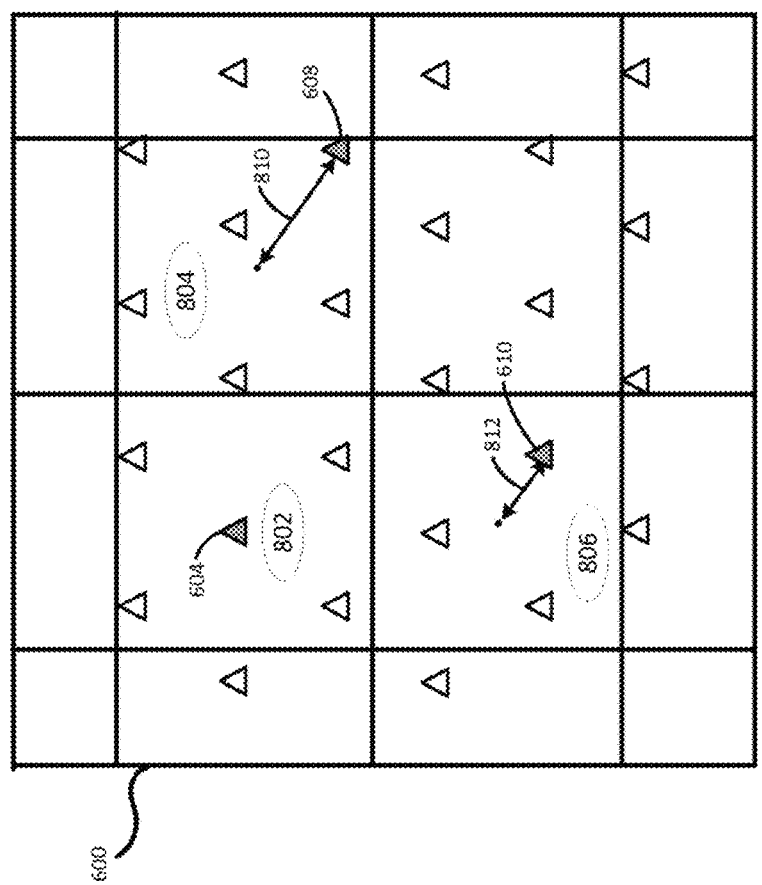
FIG. 8 illustrates an example partitioning of a service area incorporating aspects of the disclosed embodiments.

An exemplary embodiment of an iterative algorithm for determining the most advantageous partitioning of access nodes into control areas is illustrated in FIGS. 6, 7, and 8. FIGS. 6 and 8 illustrate access nodes 602, generally in the form of a triangle, distributed evenly throughout a service area 600. The service area 600 is the aggregate coverage area of all the access nodes 602. The set of lagging access nodes 604, 608, 610 is determined as previously described based on a service metric computed for all the access nodes 602 in the service area 600.

In the embodiment illustrated in FIG. 6, a set of three lagging access nodes 604, 608, 610 is shown. The iterative algorithm is initiated by determining the minimum distance 606 between adjacent pairs of the lagging access nodes 604, 608, and 610. Next, the number and size of the control areas are determined based on the determined minimum distance 606 using any of the aforementioned schemes.

Referring to FIG. 7, in this example, the control areas are determined using a regular pattern of rectangular control areas 700. The distance between control area centers 702, 704 is equal to the minimum distance 606 between lagging access nodes 604, 610. The control area pattern 700 is then applied iteratively to partition the access nodes 602 of the service area 600 into separate control areas.

FIG. 8 illustrates a first iteration where a first lagging access node 604 is located at the center of one control area 802 and the remaining access nodes are partitioned according to the control area pattern 700 shown on FIG. 7 to obtain a first partitioning solution. Next, an aggregate distance $\Sigma_1$ for the first solution is determined by summing the distances between each lagging access node 604, 608 and 610 and the centers of their respective control areas 802, 804, 806. Because the first lagging node 604 was placed at the center of the control area 802, the resulting distance between the center of the first control area 802 and the first lagging access node 604 is equal to zero. The distances 810 and 812 between the other lagging access nodes 608, 610 and the centers of their respective control areas 804, 806 are then summed to obtain the aggregate distance for the first solution, $\Sigma_1$. This process is then repeated iteratively for each remaining lagging access node 608, 610 by repositioning the control area pattern 700 to obtain a control area solution where one of the lagging access nodes 608, 610 is at the center of a control area and a corresponding aggregate distance $\Sigma_2$, $\Sigma_3$ is determined for each control area solution. The control area solution corresponding to the minimum aggregate distance $\Sigma_1$, $\Sigma_2$, $\Sigma_3$, is then selected as the most appropriate control area solution and used to define a set of control areas for partitioning of the access nodes during the next control phase. The lagging access nodes may be sorted according to their service metric and the iterations proceed in order from the most lagging access node to the least lagging access node. Alternatively, the iterations may be performed in other desired orders based on other criteria.

The number and size of control areas may be restricted if desired through the use of various operators. For example a minimum acceptable distance $d_{floor}$ may be used to restrict the minimum distance between lagging access nodes d. In this case the minimum distance d between lagging access nodes becomes the maximum of the true minimum distance $d_{min}$ and $d_{floor}$: $d=\max\{d_{floor}, d_{min}\}$. Alternatively a network operator may wish to impose a predetermined number of lagging access nodes or a number of control areas, thereby restricting through implication, a certain inter-control area distance.

Figure 9:
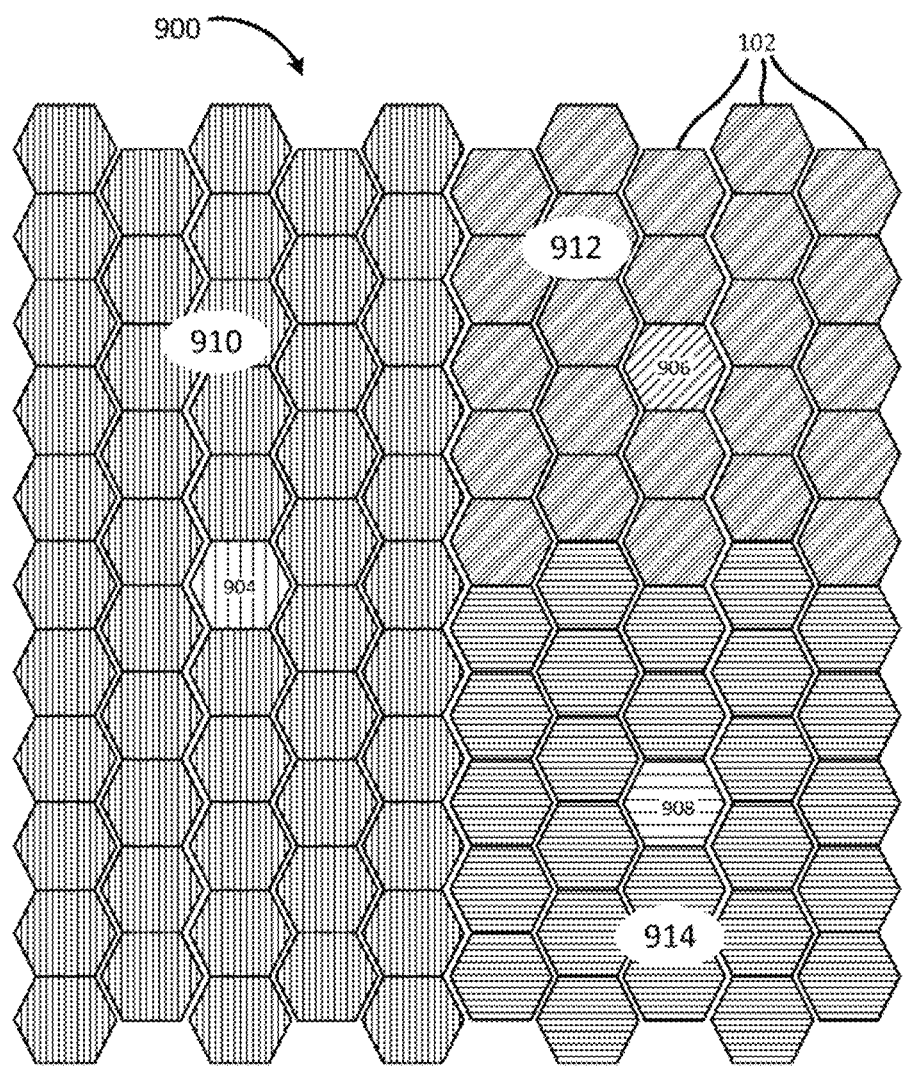
FIG. 9 illustrates an example service area partitioning with varying size control areas incorporating aspects of the disclosed embodiments.

Alternatively, a fixed number of control areas with each control area having variable size may be used. An embodiment of partitioning access nodes into a fixed number of control areas is illustrated in FIG. 9. FIG. 9 uses the earlier described notation where cells 102 are depicted as hexagons and the access node servicing each cell 102 is not shown, control areas 910, 912 are indicated by shading all cells 102 assigned to the same control area in a similar fashion. The combined coverage area of all the cells 102 is referred to as the service area 900.

In the embodiment illustrated in FIG. 9, the three most lagging access nodes 904, 906, 908 are positioned at the center of the three control areas 910, 912, 914. Rather than using predefined control area patterns, the control areas 910, 912, 914 are created by starting from each control area center 904, 906, 908 and expanding, i.e. assigning access nodes adjacent already assigned access nodes, until a control area meets an adjacent or neighboring control area. With this approach, control areas need not be expanded equally. The number of access nodes assigned to each control area need not be the same and the control area boundaries need not be half way between the two control area centers. For example it may be desirable to enlarge or assign more access nodes to control areas having a lower predicted service requirement and have smaller control areas with fewer assigned access nodes in areas with high predicted service requirements. This ensures a proportionally fairer distribution of access nodes to control areas.

Figure 10:
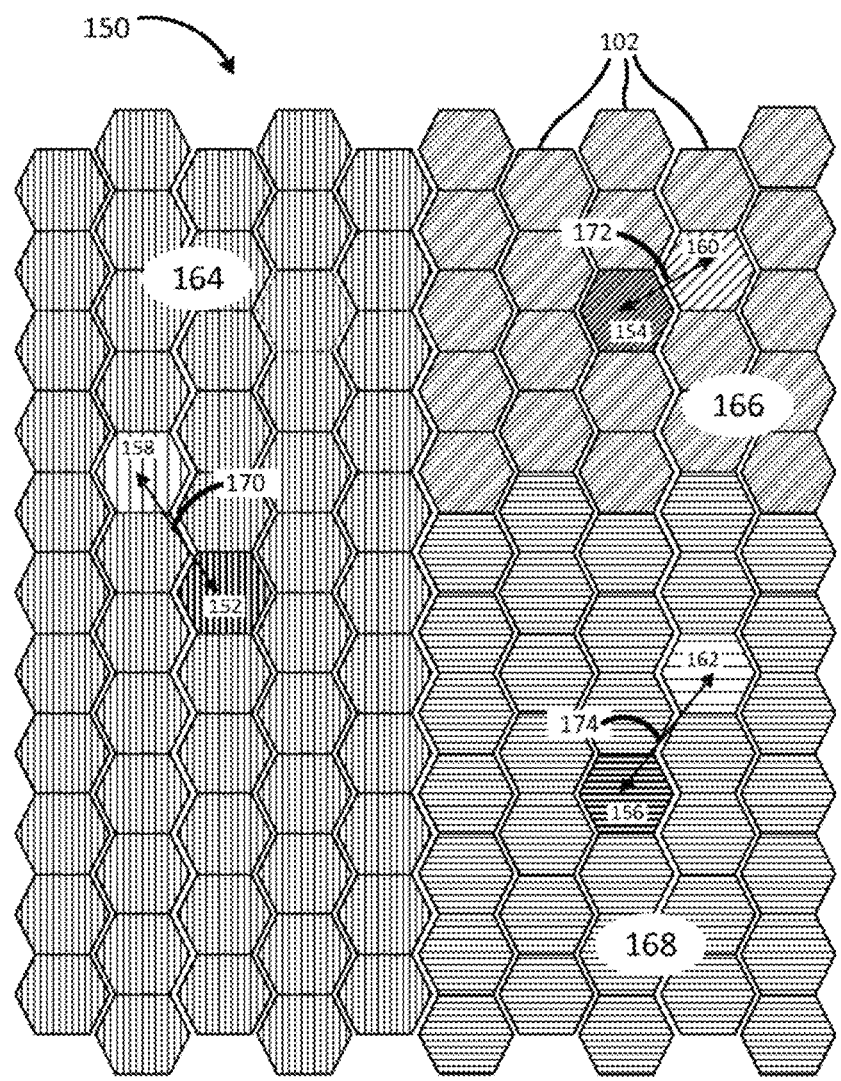
FIG. 10 illustrates partitioning of a service area using a hybrid approach incorporating aspects of the disclosed embodiments.

The above approaches may be combined for an approach where both the number and size of the control areas is variable. An approach of this type is depicted in FIG. 10. As before, cells 102 are depicted in FIG. 10 as hexagons and the access node servicing each cell is not shown, Control areas 164, 166 are indicated by shading all cells 102 assigned to the same control area in a similar fashion, and the combined coverage area of all the cells 102 is referred to as the service area 150. Allowing both the number and size of control areas to vary results in a plurality of control area partitioning solutions where the control area centers of the possible solutions differ from the lagging access nodes.

The above is illustrated in FIG. 10 where the control area 150 is partitioned into three control areas 162, 164, 166 of varying sizes or numbers of cells 102. As shown, this partitioning results in having the control area centers 152, 154, 156 being at different locations than the lagging access nodes 158, 160, 162 resulting in an aggregate distance for this solution as shown by the distances 170, 172, 174. As described above the most appropriate solution is the one corresponding to the minimum aggregate distance between control area centers 152, 154, 156 and the corresponding lagging access nodes 158, 160, 162. As before the number of control areas may be limited by defining a minimum distance between lagging access nodes such as the $d_{floor}$ value described above. Alternatively, the number of control areas, which relates to the number of lagging access nodes, may also be based on the definition of a lagging access node.

For example a lagging access node may be determined using a predefined threshold value for the chosen service metric. This threshold value may be set by a network operator or it may be computed dynamically based on long term statistics recorded from the network over time. Multiple thresholds may also be defined for classifying the service deficit of an access node as for example, very high, high, medium, low, very low, etc., resulting in multiple control area solutions based on different numbers of lagging access nodes. These various control area solutions can then be evaluated using a chosen metric to determine the desired solution for the next control phase. As a result, the number of access nodes to consider for the formation of the control areas depends on which of the above sets are considered.

In general, there is an inter-dependency between the number of the control areas and the respective size of each control area. In addition, due to limitations on the computational resources for scheduling, such as CoMP scheduling within a control area, the size of the control area may also need to be limited. As a consequence the size of the control areas may be dictated by the amount of traffic in the network area and the corresponding demands on the computational resources. Fluctuations in traffic demand throughout a day may contribute to fluctuations in the size and number of control areas into which the access nodes are partitioned at any given time. It is expected that at busy hours the size of the control areas will be relatively small while at night, when traffic demands are low, the size of control areas will be larger. Thus, the formation of control areas can be based on the aggregate service demand. In embodiments where control area formation is based on aggregate service demand, the control areas are formed so the total traffic demand in a control area does not exceed the computational or networking resources available for coordinating and scheduling of the control area.

By using the aggregated/averaged service surplus or aggregated service deficit as a service metric, which mirrors the service received by users in access nodes or clusters at control area edges, the above procedure for the control area formation guarantees fairness. The definition of the aggregate/average service surplus or deficit may be based on any key performance indicator or metric that can be used to measure service performance, such as for example throughput, cell edge user throughput, data loss, delay, number of resources available/demanded etc. Depending on the traffic in the network area the aggregate delay or latency can be used to calculate and compare the surplus/deficit among the access nodes. In these embodiments, the aggregate delay of an access node may be computed using the sum of the delays of its users. Higher values of aggregate delay indicate a higher service deficit or a more lagging access node. Alternatively, the aggregate service surplus/deficit can be based on the throughput, where a lower aggregate throughput would characterise a higher deficit or a more lagging access node. An additional alternative is to use the averaged received service instead of the aggregate service. A similar definition of aggregate/average service can be used for the cases where demanded service is considered for the formation of control areas instead of received service.

Figure 11:
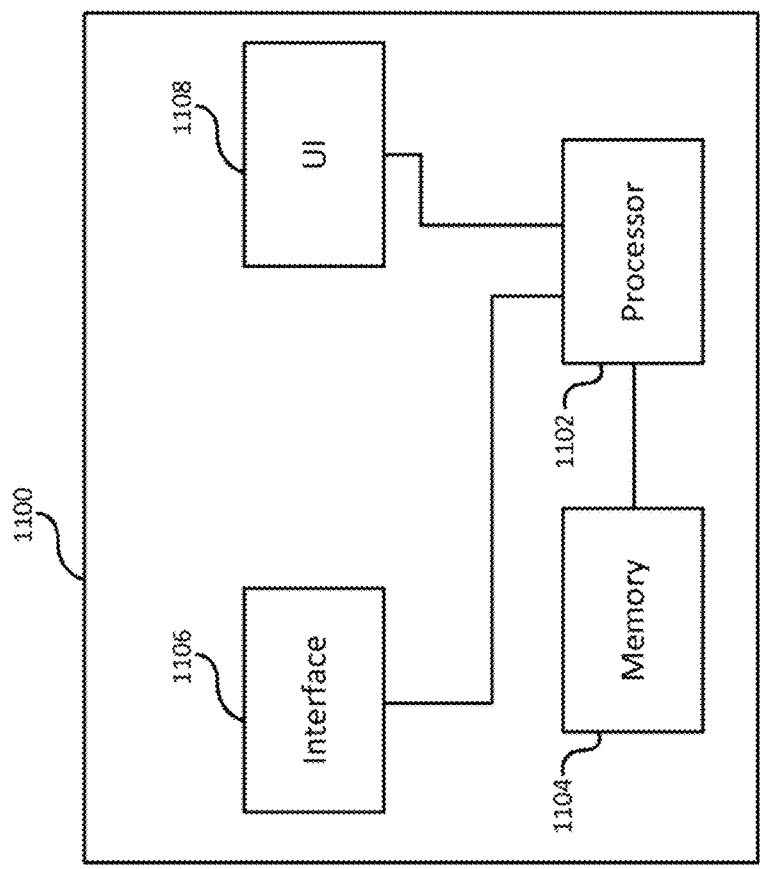
FIG. 11 illustrates a block diagram of a computing apparatus appropriate for implementing aspects of the disclosed embodiments.

FIG. 11 illustrates a block diagram of one embodiment of a computing device 1100 or server that may be configured to assign access nodes to control areas or form clusters of access nodes in a wireless communication network, such as for example, the wireless network service area 100 described above and with reference to FIG. 1. In the illustrated embodiment, the computing device 1100 includes a processor 1102 coupled to a computer memory 1104, an interface 1106 configured to communicate with other devices or nodes in a communication network, and a user interface (UI) 1108. In certain embodiments interaction with a user is not required, and in these embodiments the UI 1108 may be omitted from the computing device 1100. The apparatus 1100 may be used to form control areas within a service area of a wireless network, such as the service area 100 or it may be used to form and schedule CAMP clusters within a control area.

The computing device 1100 is appropriate for use in a server or other network based processing apparatus employed in a wireless communication network. The computing device 1100 may include one processor 1102 as illustrated in FIG. 11 or it may include a group of processors 1102 configured to operate in parallel. The processor 1102 may include special purpose devices, such as for example, digital signal processing (DSP) devices, microprocessors, or other specialized processing devices as well as one or more general purpose processors.

The memory 1104 is configured to be coupled to the processor 1102 and may be a combination of various types of computer memory such as for example volatile memory, non-volatile memory, read only memory (ROM), random access memory (RAM) or other types of computer memory. The computer memory 1104 may also include various types of network accessible storage which the processing apparatus 1102 may access via the interface 1106. The memory 1104 and stores computer program instructions which may be organized as method groups including an operating system, applications, file system, as well as other computer program instructions for other desirable computer implemented methods such as methods that support forming control areas or forming and scheduling clusters of access nodes as described in the methods and techniques disclosed herein. Also included in the memory 1104 are program data and data files which are stored and processed by the processor 1102 in accordance with computer program instructions stored in memory 1104.

For purposes herein the term processing apparatus refers to one or more computing devices 1100 coupled to each other through their respective interfaces 1106 by a computer or other type of communications network such that the one or more computing devices 1100 may operate jointly to achieve a desired purpose. The one or more computing devices 1100 may be disposed at a single physical location or they may be distributed at various locations throughout a communication network. The one or more computing devices 1100 that form a processing apparatus may be configured to jointly execute a computer program or computer process such as any of the methods for cluster formation, or control area shifting disclosed herein.

Figure 12:
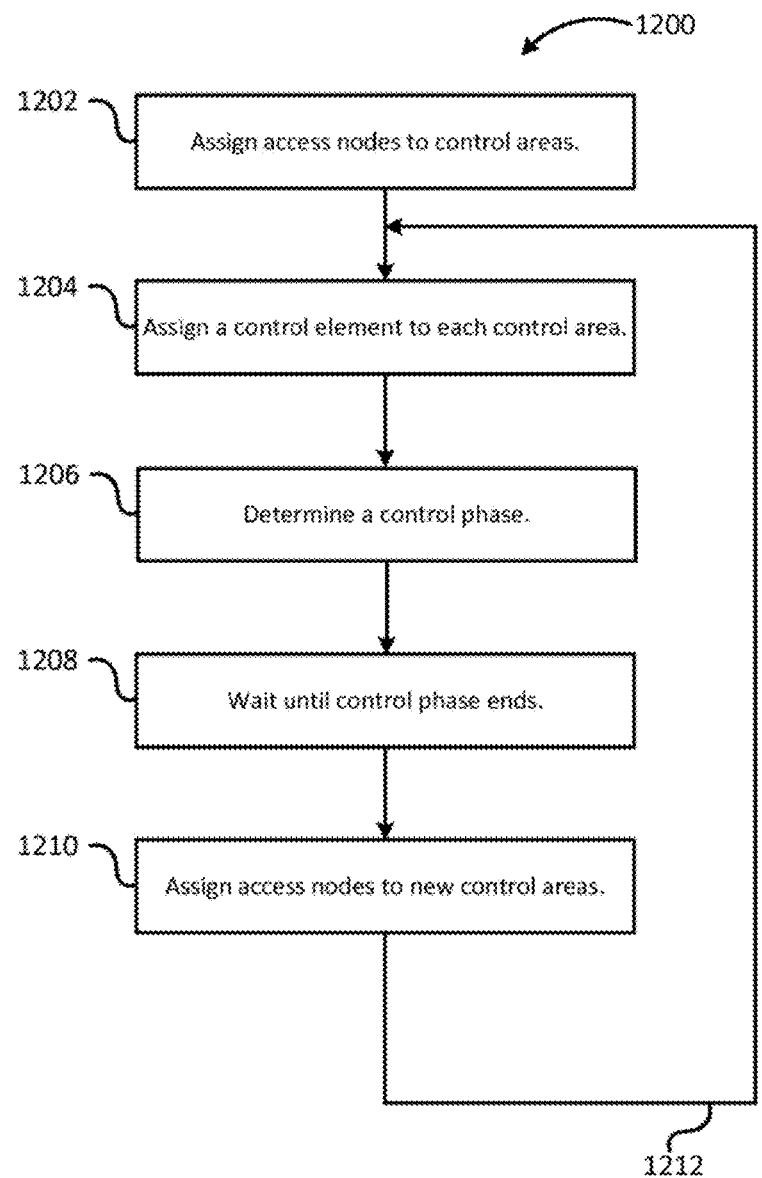
FIG. 12 illustrates a flowchart of an example embodiment of a method for shifting control areas in a wireless communication system incorporating aspects of the disclosed embodiments.

FIG. 12 illustrates a flowchart for an exemplary embodiment of a method 1200 (which may be performed by the computing device 1100) for shifting control areas in a wireless communication system. An initial set of control areas is formed by assigning 1202 access nodes of a wireless communication network to control areas based on their location within a service area, such as the service area 100 described above. Assignment 1202 of access nodes to control areas may be done using sets of predefined control areas such as the predefined control areas described above and with reference to FIGS. 2, 3, and 4. Alternatively the assignment may be accomplished using an adaptive approach where a set of lagging access nodes are identified; a size and number of control areas is determined based on the set of lagging access nodes; then the control area s are located within the service area. Locating of the control areas within the service area may be done using an iterative algorithm as described above.

Once control areas have been formed and all access node assignments are complete, for each control area a control element is assigned 1204 to schedule and coordinate the access nodes control area. The control element is configured to form clusters of access nodes and to control CoMP transmission and reception among the access nodes within its control area. A control phase is then determined 1208. The control phase is a period of during which the control area assignments remain stable. The method 1200 then waits 1208 for the control phase to end allowing the control elements to implement CoMP within each control area during the control phase.

Once the control phase ends 1208 a new set of control areas is formed 1210. The new control areas are formed 1210 in a manner as described above that avoids having an access node lying at the edge of a control area at all times. The process then repeats 1212 by assigning a control element 1204 to each new control area.

Cluster Formation

Once access nodes are assigned to control areas for an upcoming control phase, control elements associated with each control area perform resource allocation or scheduling of physical transmission resources for user nodes and access nodes within each control area. The control element forms access nodes into CoMP clusters and assigns user nodes to be serviced by each cluster. Formation of the CoMP clusters may be accomplished using an adaptive scheme based on traffic demand, channel conditions, and fairness between user nodes.

Figure 13:
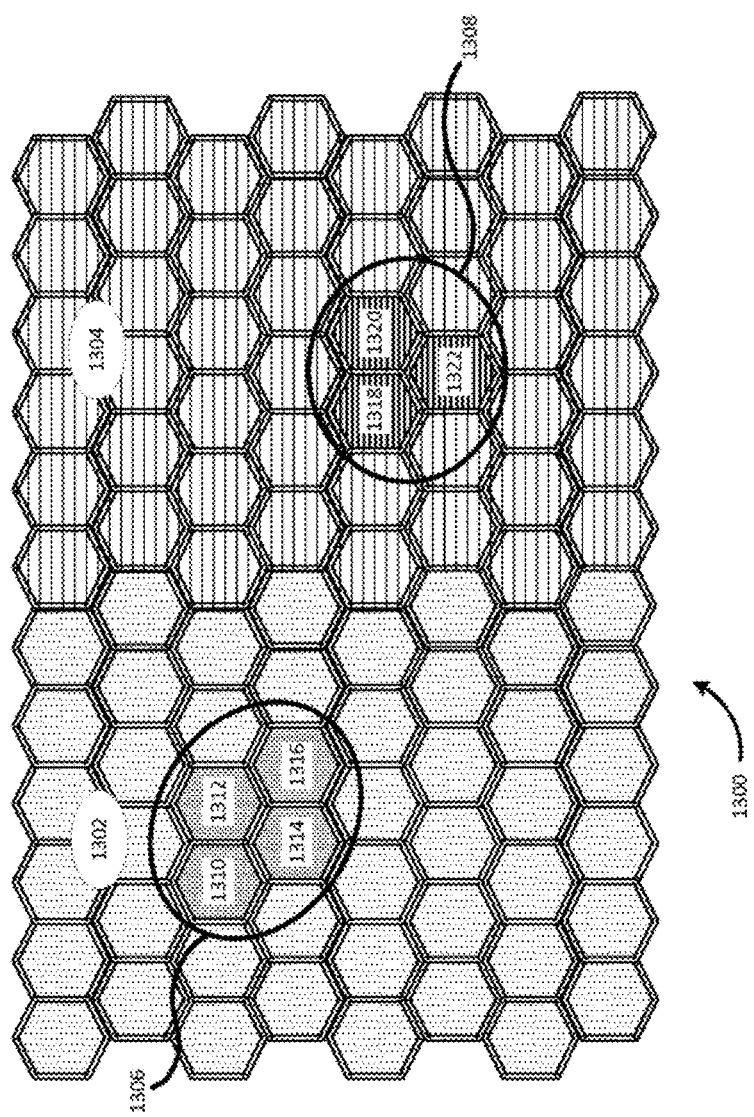
FIG. 13 illustrates a pictorial illustration of cluster formation within control areas incorporating aspects of the disclosed embodiments.

FIG. 13 illustrates a service area 1300 that is split into two substantially equal size control areas 1302, 1304 during a control phase. Each control area 1302, 1304 is illustrated as containing a single CoMP cluster 1306, 1308 respectively. The CoMP cluster 1306 includes four cells or access nodes 1310, 1312, 1314, 1316, and the other CoMP cluster 1308 includes three cells or access nodes 1318, 1320, 1322. Alternatively each control area 1302, 1304 can contain more or less than two CoMP clusters and each cluster can include more or less than three access nodes. As noted above, the use of substantially equal size control areas with uniformly shaped and distributed cells is presented only as an aid to understanding. Those skilled in the art will readily recognize that the methods and apparatus disclosed herein can be advantageously employed in service areas of various sizes and geographic shapes, with control areas of various sizes and shapes, and with cells that have regularly or irregularly shaped coverage areas and that are not distributed in a regular fashion throughout the service area.

Cluster formation within each control area 1302, 1304 proceeds in an iterative fashion. This can include identifying the best CoMP cluster among the unassigned access nodes; assigning user nodes to the identified CoMP cluster, and repeating until there are no more semi-orthogonal users or physical resources that can be scheduled.

Figure 14:
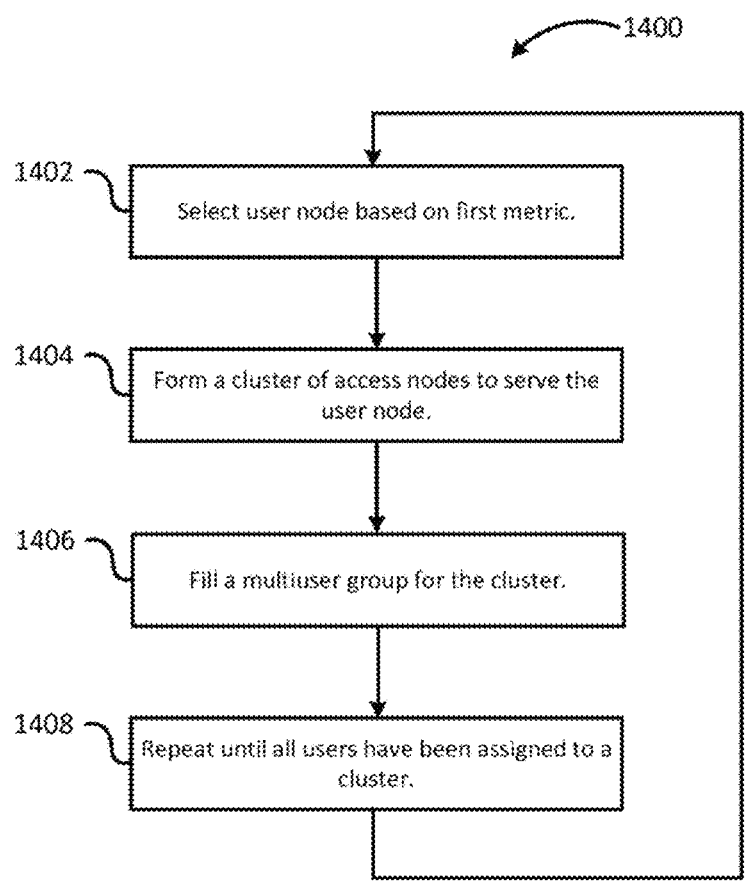
FIG. 14 illustrates a flowchart of an example embodiment of a method for forming clusters of access nodes incorporating aspects of the disclosed embodiments.

Forming clusters of access nodes and multi-user groups within a control area can be a computationally intensive and time consuming task. However, iteratively forming clusters based on scheduling metrics significantly reduces the complexity of CoMP cluster formation. FIG. 14 illustrates a flow chart for an exemplary embodiment of a method 1400 for determining clusters of access nodes as may be used for determining CoMP clusters for use within a control area during one or more control phases. The method 1400 employs an iterative approach for cluster formation that generally proceeds as follows:

Select 1402 a user node having the highest value for a chosen scheduling metric;

Form 1404 a cluster of access nodes to service the selected user node;

Assign 1406 user nodes to the cluster to fill a multi-user group based on a second metric; and Repeat 1408 the above steps until there are no more users or resources that can be scheduled.

Various scheduling metrics may be advantageously used to select a user node 1402, such as for example, a proportionally fair metric, maximum throughput, equal throughput, guaranteed throughput, or other appropriate metrics related to the service received or requested or channel conditions of a user node. In one embodiment, the scheduling metric can be based on evaluating precoders and using available access node resources. It is also advantageous to have the scheduling metric take both the interference from already scheduled user nodes and leakage to already scheduled user nodes into account. Appropriate scheduling metrics may be formulated such that higher values are better than lower values, or inversely where lower values are better than higher values. For purposes of the description herein, the term higher value or highest value is used to refer to the better or best of two or more metric values.

Once a user node is selected 1402, a cluster is formed to service the selected user node 1404. This can be done using a pre-defined method. For example, all access nodes having a channel quality or signal strength above a threshold value may be selected for the initial group of access nodes. When the use of a single threshold value results in a number of access nodes greater than a per-determined maximum number, the group size may be limited to this pre-determined maximum by taking the access nodes with the best quality or strongest signal up to the desired maximum number, i.e. the group size is based on a threshold value and limited by a maximum number. In certain embodiments it is advantageous to evaluate the scheduling metric based on more than one user node or an entire multi-user group of user nodes rather than using only a single user node. This has the potential of providing more efficient CoMP cluster formation; however it comes at the cost of increased computational requirements.

In many instances there are several access nodes available to service the selected user node and these access nodes may be formed 1404 into a number of different clusters. To select the best cluster among the possible or candidate clusters, a scheduling metric is evaluated for each candidate cluster, and the candidate cluster having the highest or best metric value is selected as the cluster for servicing the user node 1404. The scheduling metric used for selecting the best candidate cluster may be the same metric used for the initial user node selection or alternatively it may be advantageous to use a different metric for selection of the best candidate cluster as the CoMP cluster to be formed.

After defining the CoMP cluster as described above, additional user nodes are assigned 1406 to the cluster by selecting user nodes that can participate in a spatial multi-user group. A spatial multi-user group is a group of user nodes that are spatially enough separated to be grouped for simultaneous transmission. The additional user nodes to be added to the spatial multiuser group may be selected using a second metric, such as for example, the principle of semi-orthogonal user selection (SUS), or signal to interference plus leakage plus noise ratio (SILNR). The SILNR metric used here is similar to a signal to leakage plus noise ratio with the interference term being the result of interference from user nodes already scheduled by the same control element. The CoMP cluster is filled when there are no more semi-orthogonal user nodes or physical resources left that can be scheduled in the CoMP cluster being formed.

Once the CoMP cluster is filled the process repeats 1408 by evaluating the chosen scheduling metric again for the remaining user nodes and access nodes that have not already been scheduled in a CoMP cluster. When evaluating the chosen scheduling metric for user nodes and access nodes in subsequent iterations, the interference caused by user nodes which have already been scheduled within the control area can be accounted for by inclusion in the selected scheduling metric. Similarly, leakage which is the interference caused by the candidate user node on already scheduled user nodes may also be taken into account.

When there are no more user nodes or access nodes remaining that fit the clustering criteria, the scheduling is complete for the particular control area. The current CoMP clusters and multi-user groupings may be used for multiple transmissions when desired. It is also possible to carry the same CoMP clusters and multi-user groups forward to the next control phase when a particular control area remains the same. However, when using control area formation as described above, the control areas will likely change between control phases and in most instances cluster formation and multi-user groupings will change accordingly.

In one embodiment, once scheduling is complete for a control area, the final precoders are calculated for each user node and a SINR estimate is available for all the scheduled user nodes. At this point it may be desirable in certain embodiments to un-schedule or remove user nodes from a cluster when the signal quality of a user node is below an acceptable threshold. For example a user node with a SINR estimate below about −7 decibels (dB) is unlikely to be able to extract data from received signals. Thus, transmitting data to user nodes with low SINR values may cause interference on other user nodes and will likely not improve the overall transmission rate. The scheduling algorithms discussed above are configured to schedule user nodes such that they are enough orthogonal in the spatial domain for reliable transmission. However, precise SINR estimates are not available before the final scheduling decision and precoder calculations are completed.

In one embodiment, a link matrix containing channel information for each access node antenna to user node link may be employed to determine a user node and cluster. The link matrix is an n by m matrix where n is the number of access node antennas in the control area and m is the number of user nodes being served by the control area. The channel information may be obtained from the access nodes in the form of channel estimates or other appropriate channel information, or it may be feedback information from each user node such as a channel quality indicator, channel estimate, or other value providing an indication of link quality. The best link is then chosen by applying the chosen scheduling metric, such as a proportionally fair metric and taking interference and leakage of any already scheduled users into account. The access node and user node associated with the best link becomes the basis for forming 1402 the clusters.

Additional access nodes are assigned 1406 to the cluster based on their distance or link quality up to a desired maximum number of access nodes. As before, the distance may be a physical distance, signal strength, or other desired type of distance measurement. Additional users are then assigned 1406 to the cluster to form a spatial multi-user group using a second metric such as SUS or SILNR as described above. Once a cluster is completely defined, the link matrix, with any already scheduled user nodes and antennas removed, is used to repeat 1408 the selecting, forming, and assigning steps to form subsequent clusters until all user nodes or access node resources that meet the clustering criteria have been scheduled.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for assigning a plurality of access nodes of a wireless communication network to control areas, the apparatus comprising:
   a processing apparatus, configured to:
   assign each access node in the plurality of access nodes to a control area of a plurality of control areas;
   determine a first control phase, wherein a control phase comprises a period of time during which the assignment of access nodes to control areas remains constant;
   when changing from the first control phase to a following second control phase:
      reassign at least a subset of access nodes which were assigned to a first control area of the plurality of control areas during the first control phase to a second control area of the plurality of control areas, and
      reassign at least a subset of access nodes which were assigned to a third control area of the plurality of control areas during the first control phase to the first control area;
   reassign the control areas such that an access node that is adjacent a boundary of the first control area during the first control phase is no longer adjacent the boundary of the first control area during the following second control phase; and
   instruct access nodes assigned to a same control area to perform coordinated multi-point transmission or reception or multi-input multi-output type transmissions.

2. The apparatus of claim 1, wherein the processing apparatus is further configured to:
   determine a set of lagging access nodes in the plurality of access nodes based on a service metric; and
   assign and reassign the access nodes to the plurality of control areas based on the determined set of lagging access nodes.

3. The apparatus of claim 2, wherein the service metric comprises:
   a ratio of aggregate service requested from an access node to aggregate service provided by the access node;
   a difference between aggregate service requested from an access node to aggregate service provided by the access node; or
   a set of predefined threshold values indicating a service surplus or service deficit associated with an access node.

4. The apparatus of claim 1, wherein the processing apparatus is configured to:
   determine a size of each of the plurality of control areas based on a distance threshold between centers of two adjacent control areas;
   determine a set of lagging access nodes in the plurality of access nodes and for each lagging access node in the set of lagging access nodes:
      assign the lagging access node to a first control area in a respective candidate set of control areas such that a distance between a center of the first control area and the first lagging access node is minimized,
      assign each of the remaining lagging access nodes to a remaining control area in the respective candidate set of control areas, and
      compute an aggregate sum distance by summing a distance between each lagging access node in the set of lagging access nodes and a center of the control area in the respective candidate set of control areas to which the lagging access nodes is assigned; and
   choose the candidate set of control areas for assigning the access nodes to, which exhibits the lowest aggregate sum distance.

5. The apparatus of claim 1, wherein the processing apparatus is further configured to determine a number of control areas of the plurality of control areas based on an expected network load in the control areas and to assign the access nodes to the plurality of control areas in dependence on the determined number of control areas to be formed.

6. The apparatus of claim 5, wherein the processing apparatus is further configured to vary the number of control areas between different control phases, in dependence on an expected network load during the different control phases.

7. The apparatus of claim 1, wherein the apparatus further comprises:
   an interface coupled to the processing apparatus, the interface configured to communicate with a plurality of control elements; and
   wherein the processing apparatus is further configured to communicate information about the assignment of the access nodes to the control areas to at least one control element in the plurality of control elements.

8. The apparatus of claim 1, wherein the processing apparatus is configured to assign the access nodes to the control areas, such that each access node is assigned to only one control area per control phase.

9. The apparatus of claim 1, wherein the processing apparatus is configured to assign for each control area a dedicated control element configured to control the access nodes assigned to the respective control area.

10. The apparatus of claim 1, wherein the processing apparatus is configured to change from the first control phase to the following second control phase in response to a change of an expected network load at the plurality of access nodes.

11. The apparatus of claim 1, wherein the processing apparatus is configured to:
    determine a set of lagging access nodes in the plurality of access nodes;
    determine the number of control areas of the plurality of control areas based on the number of lagging access nodes in the set of lagging nodes; and
    assign the access nodes to the control areas by:
        firstly assigning each lagging access node to a separate control area, such that a distance between the lagging access node and the control area to which the lagging access node is assigned is minimized, and
        subsequently assigning the remaining access nodes in the plurality of access nodes to the control areas based on a location of the access nodes and an expected load of the access nodes, until all access nodes are assigned to a control area.

12. A method for assigning a plurality of access nodes of a wireless communication network to control areas, the method comprising:
    assigning each access node in the plurality of access nodes to a control area of a plurality of control areas;
    determining a first control phase, wherein a control phase comprises a period of time during which the assignment of access nodes to control areas remains constant;
    when changing from the first control phase to a following second control phase:
        reassigning at least a subset of access nodes which were assigned to a first control area of the plurality of control areas during the first control phase to a second control area of the plurality of control areas, and
        reassigning at least a subset of access nodes which were assigned to a third control area of the plurality of control areas during the first control phase to the first control area;
    reassigning the control areas such that an access node that is adjacent a boundary of the first control area during the first control phase is no longer adjacent the boundary of the first control area during the following second control phase; and
    instructing access nodes assigned to a same control area to perform coordinated multi-point transmission or reception or multi-input multi-output type transmissions.

13. The method of claim 12, further comprising:
    determining a set of lagging access nodes in the plurality of access nodes based on a service metric; and
    assigning and reassigning the access nodes to the plurality of control areas based on the determined set of lagging access nodes.

14. The method of claim 13, wherein the service metric comprises:
    a ratio of aggregate service requested from an access node to aggregate service provided by the access node;
    a difference between aggregate service requested from an access node to aggregate service provided by the access node; or
    a set of predefined threshold values indicating a service surplus or service deficit associated with an access node.

15. The method of claim 12, further comprising:
    determining a number of control areas of the plurality of control areas based on an expected network load in the control areas and to assign the access nodes to the plurality of control areas in dependence on the determined number of control areas to be formed.

16. The method of claim 15, further comprising:
    varying the number of control areas between different control phases, in dependence on an expected network load during the different control phases.

17. The method of claim 12, further comprising:
    assigning for each control area a dedicated control element configured to control the access nodes assigned to the respective control area.

* * * * *